(12) United States Patent
Kamio et al.

(10) Patent No.: US 10,877,236 B2
(45) Date of Patent: Dec. 29, 2020

(54) LENS BARREL AND CAMERA

(71) Applicant: NIKON CORPORATION, Tokyo (JP)

(72) Inventors: Kazuaki Kamio, Tokyo (JP); Takuji Hamasaki, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 799 days.

(21) Appl. No.: 15/538,718

(22) PCT Filed: Dec. 24, 2015

(86) PCT No.: PCT/JP2015/085907
§ 371 (c)(1),
(2) Date: Nov. 16, 2017

(87) PCT Pub. No.: WO2016/104547
PCT Pub. Date: Jun. 30, 2016

(65) Prior Publication Data
US 2018/0113271 A1 Apr. 26, 2018

(30) Foreign Application Priority Data
Dec. 26, 2014 (JP) .................................. 2014-266558

(51) Int. Cl.
*G02B 7/04* (2006.01)
*G03B 17/14* (2006.01)
(Continued)

(52) U.S. Cl.
CPC .................. *G02B 7/04* (2013.01); *G03B 5/00* (2013.01); *G03B 17/12* (2013.01); *G03B 17/14* (2013.01);
(Continued)

(58) Field of Classification Search
CPC .......... G02B 7/02; G02B 7/021; G02B 7/026; G02B 7/025; G02B 7/022; G02B 7/023;
(Continued)

(56) References Cited

U.S. PATENT DOCUMENTS

2014/0253793 A1* 9/2014 Kang ..................... G02B 7/04
348/373
2014/0340773 A1* 11/2014 Konishi ................ G03B 13/34
359/823
(Continued)

FOREIGN PATENT DOCUMENTS

JP H06-160697 A 6/1994
JP H8-262302 A 10/1996
(Continued)

OTHER PUBLICATIONS

Dec. 9, 2019 Office Action issued in Chinese Patent Application No. 201580074646.7.
(Continued)

*Primary Examiner* — Collin X Beatty
*Assistant Examiner* — Grant A Gagnon
(74) *Attorney, Agent, or Firm* — Oliff PLC

(57) ABSTRACT

Lens barrel includes: a first barrel; and a second barrel that is arranged on an outer circumferential side or on an inner circumferential side of first barrel, second barrel being movable in a first direction relative to first barrel without being rotated relative to the first barrel, wherein: second barrel has a first engaging part that protrudes toward first barrel and a second engaging part that protrudes toward first barrel, the second engaging part being different from first engaging part; the first barrel has a first engaged part with which the first engaging part is engaged so as to be linearly movable and a second engaged part with which the second engaging part is engaged so as to be linearly movable; and one end of the first engaging part and another end of the second engaging part are arranged at different positions in a linear motion direction.

16 Claims, 6 Drawing Sheets

(51) Int. Cl.
  *G03B 17/12*  (2006.01)
  *G03B 5/00*  (2006.01)
  *G02B 7/02*  (2006.01)

(52) U.S. Cl.
  CPC ...... *G02B 7/021* (2013.01); *G03B 2205/0046* (2013.01); *G03B 2205/0053* (2013.01)

(58) Field of Classification Search
  CPC ........ G02B 7/003; G02B 7/08; G02B 13/001; G02B 13/0085; G02B 7/04; G02B 23/2476; G02B 3/00; G02B 7/102; G02B 13/003; G02B 27/0018; G02B 27/62; G02B 7/004; G02B 13/0035; G02B 13/006; G02B 13/18; G02B 25/002; G02B 27/0006; G02B 27/0025; G02B 3/0062; G02B 3/0075; G02B 5/003; G02B 7/10; G02B 7/14; G02B 7/1825; G02B 9/12; G02B 13/0025; G02B 13/004; G02B 13/146; G02B 19/0076; G02B 21/33; G02B 23/12; G02B 23/16; G02B 23/2423; G02B 23/243; G02B 23/2446; G02B 23/2492; G02B 23/26; G02B 25/005; G02B 25/008; G02B 26/124; G02B 26/125; G02B 27/646; G02B 3/0018; G02B 3/0056; G02B 3/0068; G02B 3/0081; G02B 3/0087; G02B 5/005; G02B 6/32; G02B 6/3652; G02B 6/3656; G02B 6/3829; G02B 6/3853; G02B 6/3885; G02B 6/4214; G02B 6/4225; G02B 6/4226; G02B 6/4237; G02B 6/4249; G02B 6/43; G02B 7/00; G02B 7/001; G02B 7/105; G03B 17/12; G03B 17/14; G03B 17/02; G03B 3/10; G03B 11/00; G03B 21/142; G03B 11/045; G03B 17/04; G03B 17/08; G03B 17/17; G03B 17/55; G03B 17/561; G03B 17/565; G03B 19/023; G03B 21/005; G03B 21/145; G03B 2205/00; G03B 2205/0069; G03B 2217/00; G03B 2217/002; G03B 35/10; G03B 43/00; G03B 5/00
  USPC ........................................................ 359/819
  See application file for complete search history.

(56) References Cited

U.S. PATENT DOCUMENTS

| | | | | |
|---|---|---|---|---|
| 2014/0340777 | A1* | 11/2014 | Konishi | G02B 27/646 |
| | | | | 359/826 |
| 2014/0355133 | A1* | 12/2014 | Uno | G03B 5/00 |
| | | | | 359/700 |
| 2015/0070782 | A1* | 3/2015 | Yamamoto | G02B 7/102 |
| | | | | 359/700 |
| 2016/0004030 | A1* | 1/2016 | Shiramizu | G03B 17/12 |
| | | | | 359/826 |

FOREIGN PATENT DOCUMENTS

| | | |
|---|---|---|
| JP | 2002-182094 A | 6/2002 |
| JP | 2004-139061 A | 5/2004 |

OTHER PUBLICATIONS

Feb. 19, 2019 Office Action issued in Chinese Patent Application No. 201580074646.7.
Apr. 17, 2018 Office Action issued in Japanese Patent Application No. 2016-566415.
Mar. 29, 2016 International Search Report issued in International Patent Application No. PCT/JP2015/085907.
Jul. 14, 2020 Office Action issued in Japanese Patent Application No. 2019-212984.

* cited by examiner

US 10,877,236 B2

LENS BARREL AND CAMERA

TECHNICAL FIELD

The present invention relates to a lens barrel camera including the lens barrel.

BACKGROUND ART

A lens barrel has been disclosed in which each of two barrels moving relative to each other includes protrusions and grooves for guiding linear motion of the barrels (see PTL1).

CITATION LIST

Patent Literature

PTL1: Japanese Laid-Open Patent Publication No. H8-262302

SUMMARY OF INVENTION

Technical Problem

The larger a length (hereinafter also referred to as an "engagement length") of a part where a protrusion and a groove engage with each other in a direction along an optical axis OA in two barrels which move relative to each other, the smaller a backlash between the barrels. This allows stable optical performance to be maintained.

However, a lens barrel having barrels that can be extended out longer requires a space in which the barrels moving a long distance can be retracted. This causes a problem of a smaller engagement length.

Solution to Problem

In order to solve the above problem, a lens barrel according to an embodiment of the present invention comprises: a first barrel; and a second barrel that is arranged on an outer circumferential side or on an inner circumferential side of the first barrel, the second barrel being movable in a first direction relative to the first barrel without being rotated relative to the first barrel, wherein: the second barrel has a first engaging part that protrudes toward the first barrel and a second engaging part that protrudes toward the first barrel, the second engaging part being different from the first engaging part; the first barrel has a first engaged part with which the first engaging part is engaged so as to be linearly movable and a second engaged part with which the second engaging part is engaged so as to be linearly movable; and one end of the first engaging part and another end of the second engaging part are arranged at different positions in a linear motion direction.

According to another embodiment to the present invention, a camera comprises the lens barrel as described above.

DESCRIPTION OF EMBODIMENTS

An embodiment of the present invention will now be described with reference to the drawings and the like. The figures described below have a XYZ Cartesian coordinate system for ease of explanation and understanding. In this coordinate system, the plus X direction is a leftward direction as viewed from a photographer's perspective when the photographer holds a camera in a position (hereinafter referred to as a "regular position") for taking a wide image with an optical axis OA being horizontal. Further, the plus Y direction is an upward direction as viewed from the regular position. Still further, the plus Z direction or a front side indicates a direction toward an object from the regular position, and the minus Z direction or a rear side indicates a direction toward an image plane.

In the following description, a motion in a direction parallel to the optical axis OA is referred to as a "linear motion" and a rotational motion around the optical axis OA is referred to as a "rotation".

Figure 1:
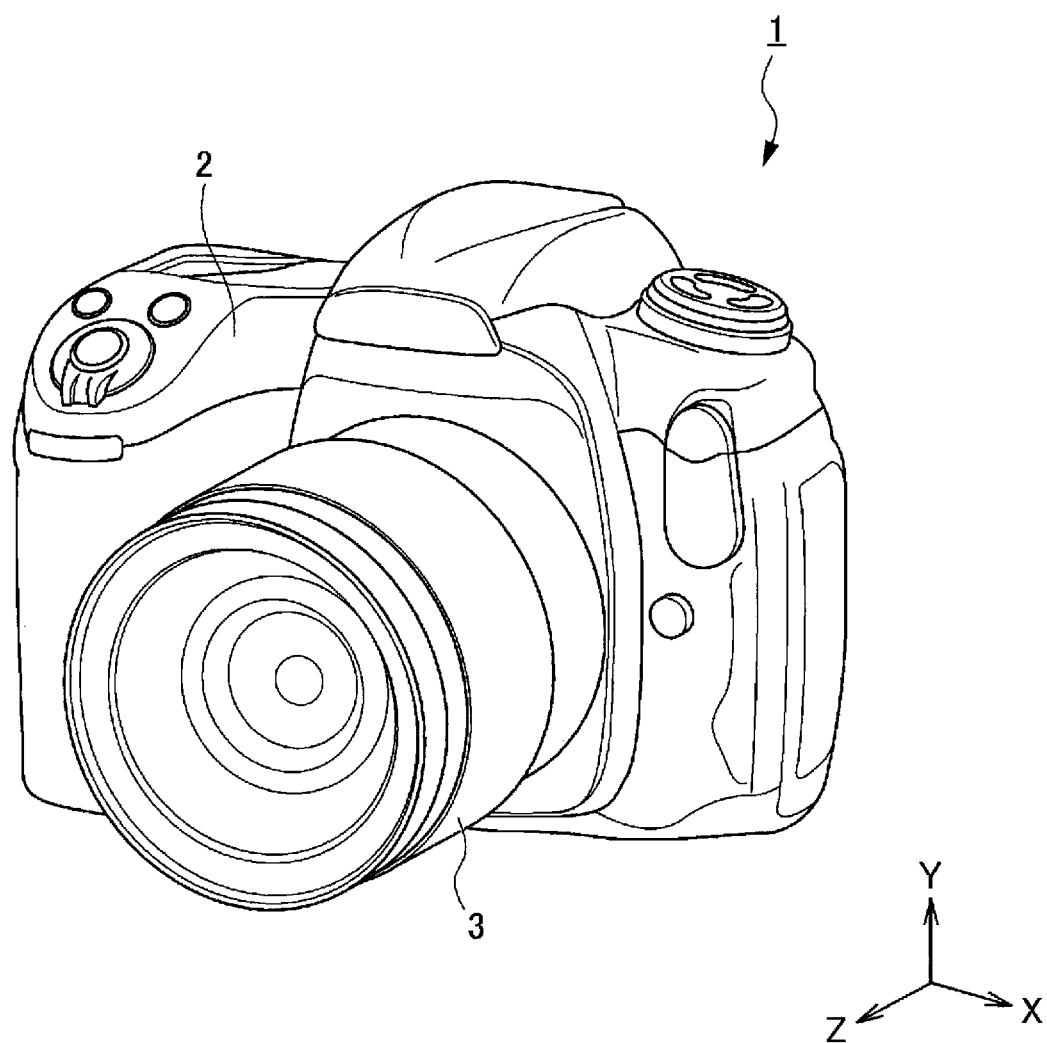
FIG. 1 is an overall view of a camera 1 according to an embodiment.

FIG. 1 is an overall view of a camera 1 according to this embodiment.

As illustrated in FIG. 1, the camera 1 includes a camera body 2 and a lens barrel 3 detachable from the camera body 2. The camera body 2 includes an image sensor (not shown) that captures a subject image formed by the lens barrel 3. The camera body 2 further includes a mount part (not shown) that can be engaged with a bayonet part of the lens barrel 3. The lens barrel 3 is a retractable zoom lens. That is, the focal length of the lens barrel 3 is continuously variable and the total length of the lens barrel 3 can be reduced when not in use. The lens barrel 3 includes a plurality of lens groups constituting a photographing optical system and a plurality of lens frames or the like (not shown) that hold the lens groups, in a cylindrical housing. The bayonet part (not shown) of the lens barrel 3 is fit into the mount part of the camera body 2 and rotated around the optical axis OA in a predetermined direction, so that the lens barrel 3 can be attached to the camera body 2. In this context, the camera 1 according to this embodiment is a digital single lens reflex camera having interchangeable lenses.

A configuration of the lens barrel 3 will now be described. The lens groups, a diaphragm mechanism, and the like are omitted in the figures described below.

Figure 2:
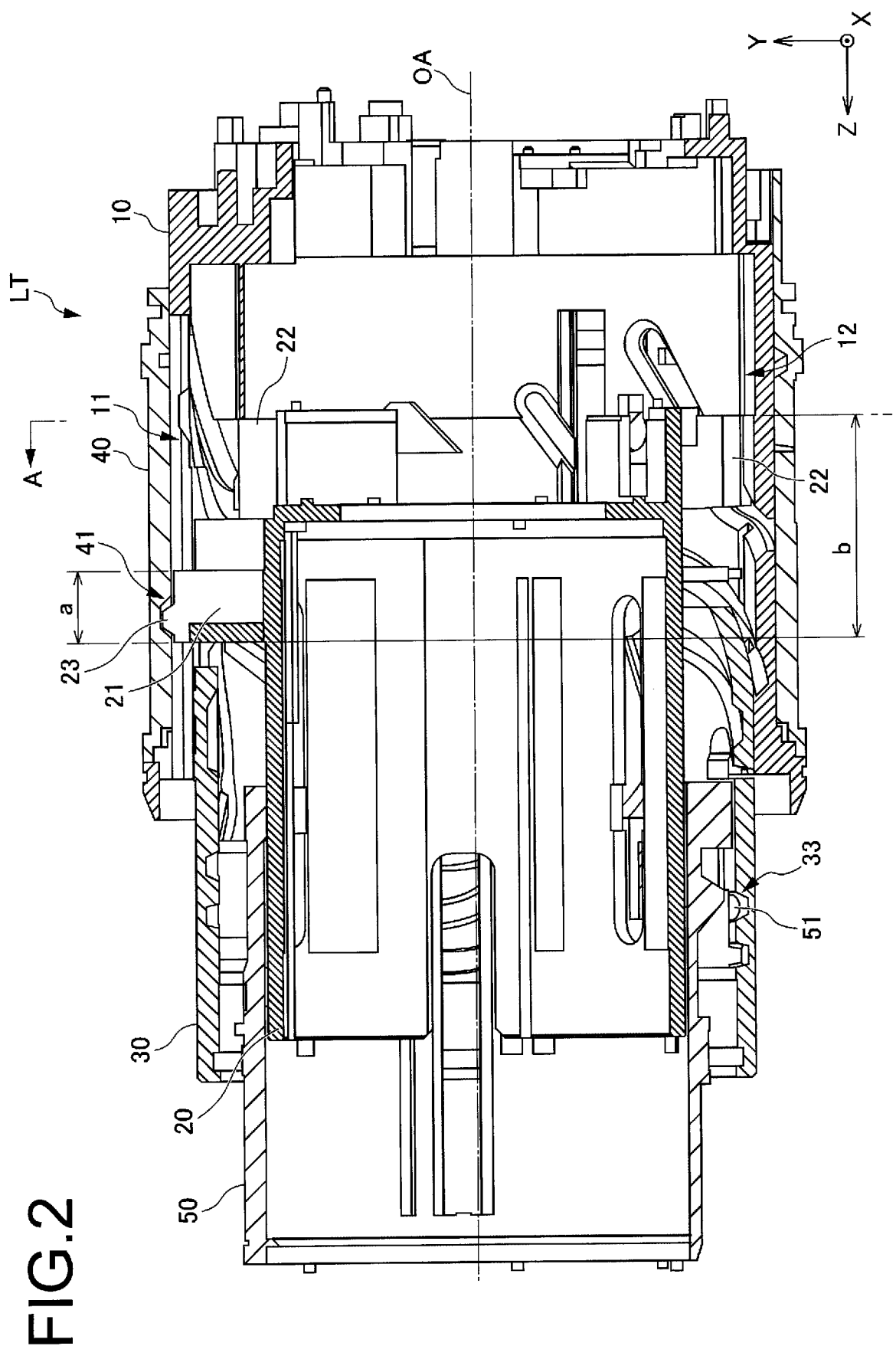
FIG. 2 is a cross-sectional view illustrating a configuration of a fixed barrel and other components of a lens barrel 3.
Figure 3:
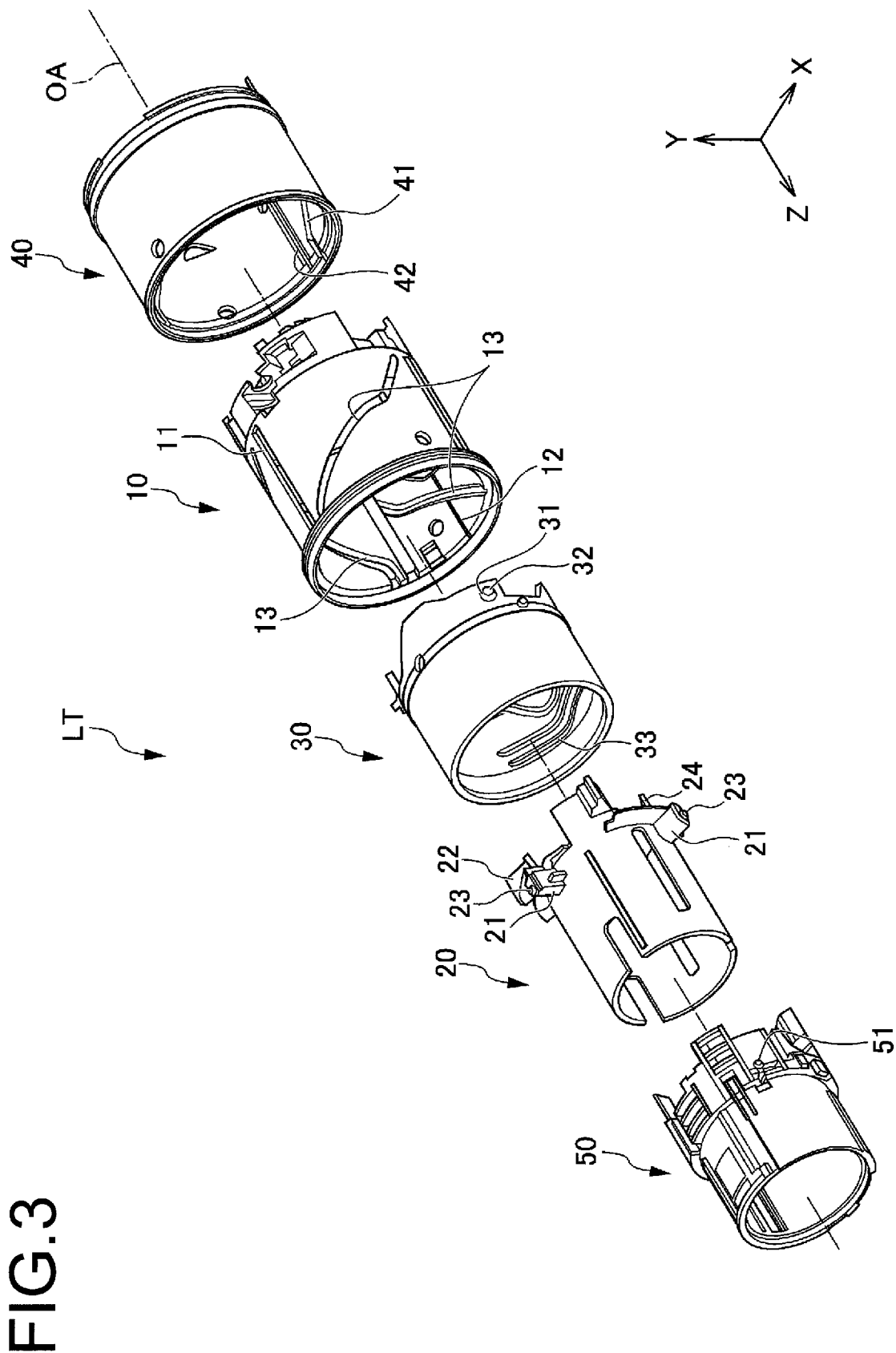
FIG. 3 is an exploded perspective view illustrating a configuration of the fixed barrel and other components of the lens barrel 3.
Figure 4:
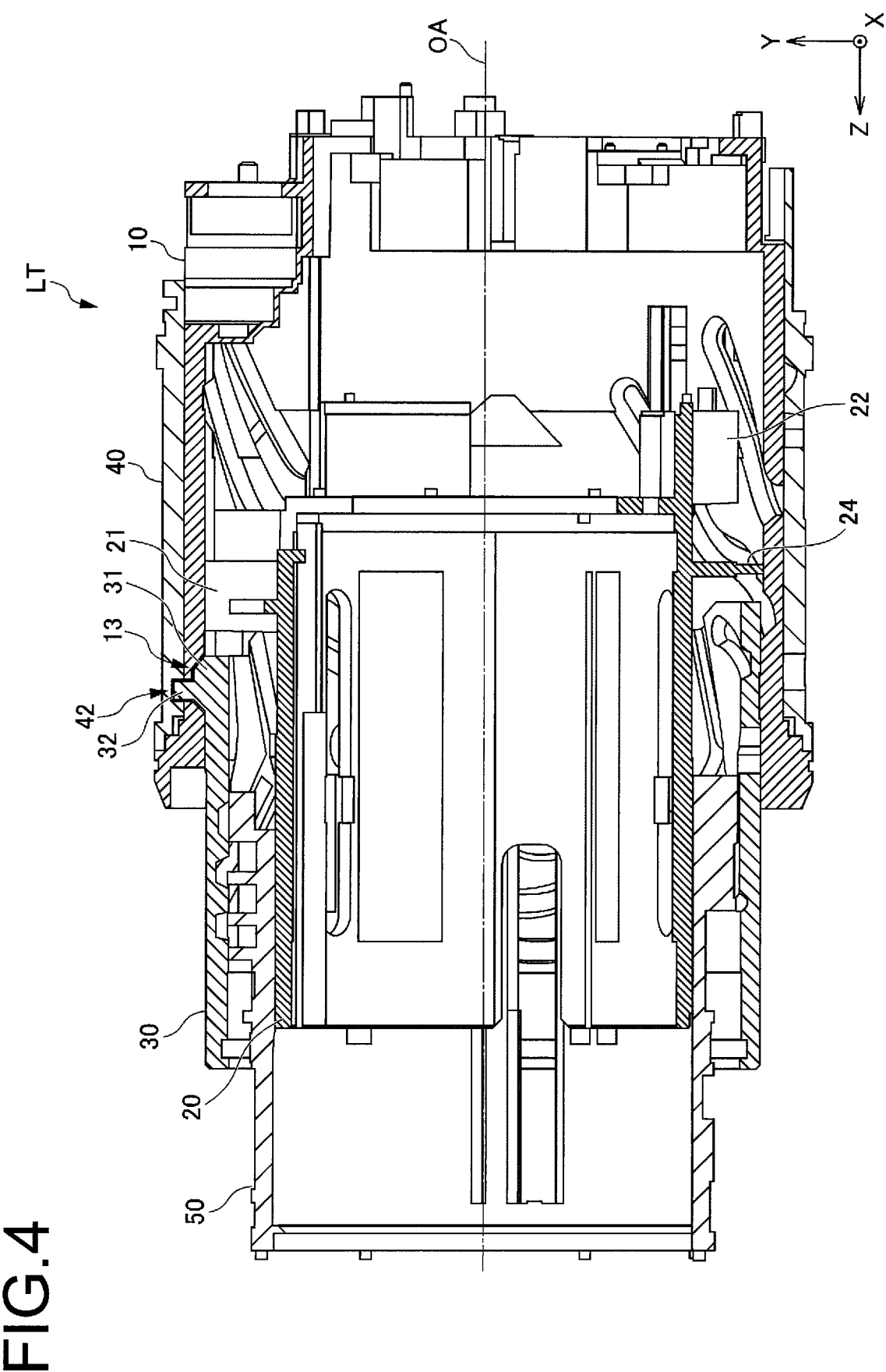
FIG. 4 is a cross-sectional view illustrating a configuration of the fixed barrel and other components of the lens barrel 3.
Figure 5:
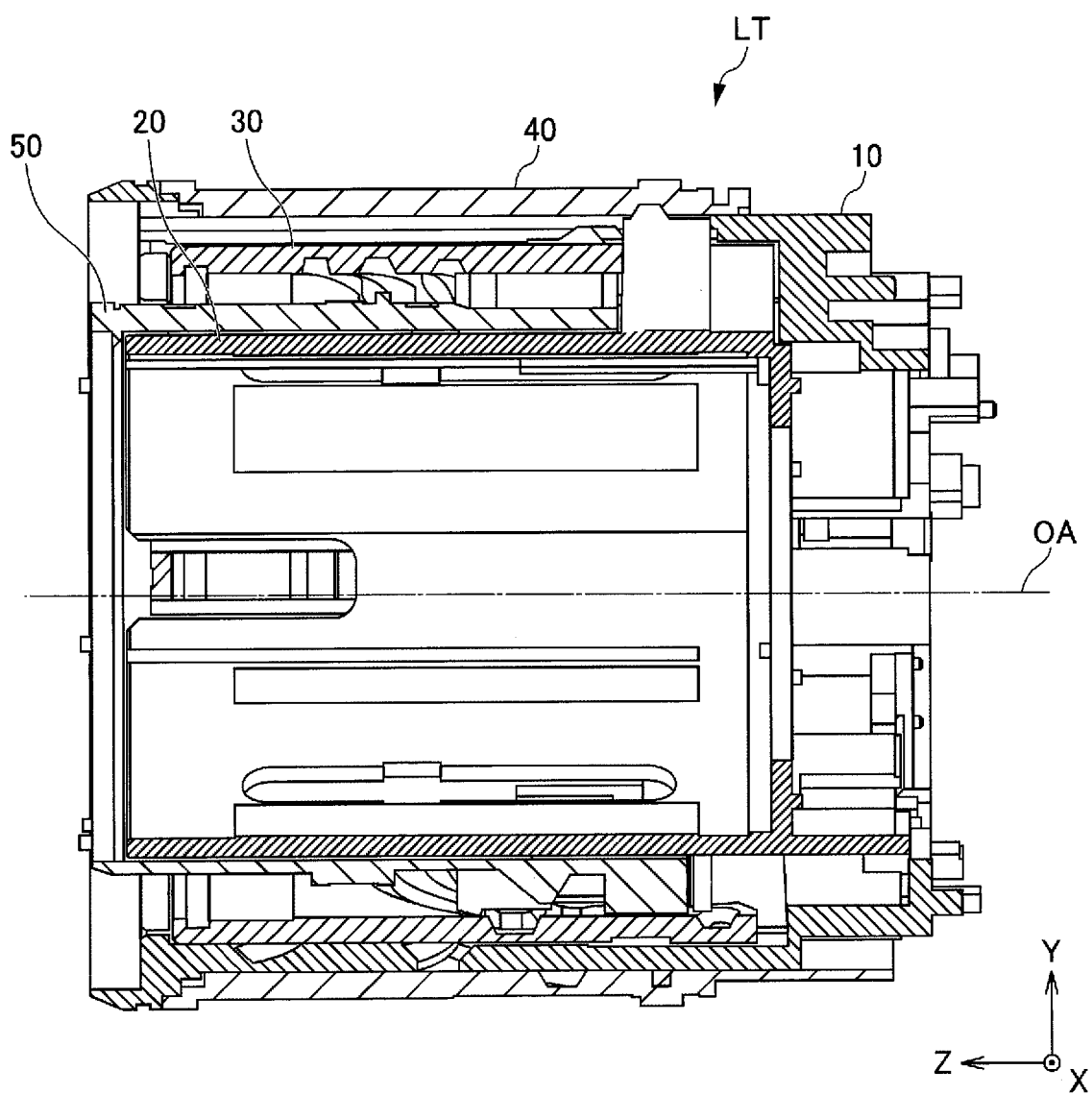
FIG. 5 is a cross-sectional view illustrating the configuration of the fixed barrel and other components of the lens barrel 3.

FIGS. 2, 4, and 5 are cross-sectional views illustrating a configuration (hereinafter, also referred to as a "lens barrel component assembly LT") made of a fixed barrel, which is a main part of the lens barrel 3, and other components. FIG. 3 is an exploded perspective view illustrating a configuration made of the fixed barrel, which is a main part of the lens barrel 3, and other components.

FIGS. 2 and 4 are cross-sectional views of the lens barrel assembly in a state where barrels are extended out from the fixed barrel 10 to their longest position (for example, in a telephoto end state). FIG. 4 is a cross-sectional view of the lens barrel component assembly LT illustrated in FIG. 2 in a state where it has been rotated around the optical axis OA clockwise by 30 degrees from the position in FIG. 2 in the plus Z direction.

FIG. 4 is a cross-sectional view of the lens barrel assembly in a state where barrels are retracted back to the fixed barrel 10 to their shortest position (for example, in a retracted state). In FIGS. 2 to 4, hatching indicating cross sections of the members is partly omitted for ease of illustration of overlapping of the members.

Figure 6:
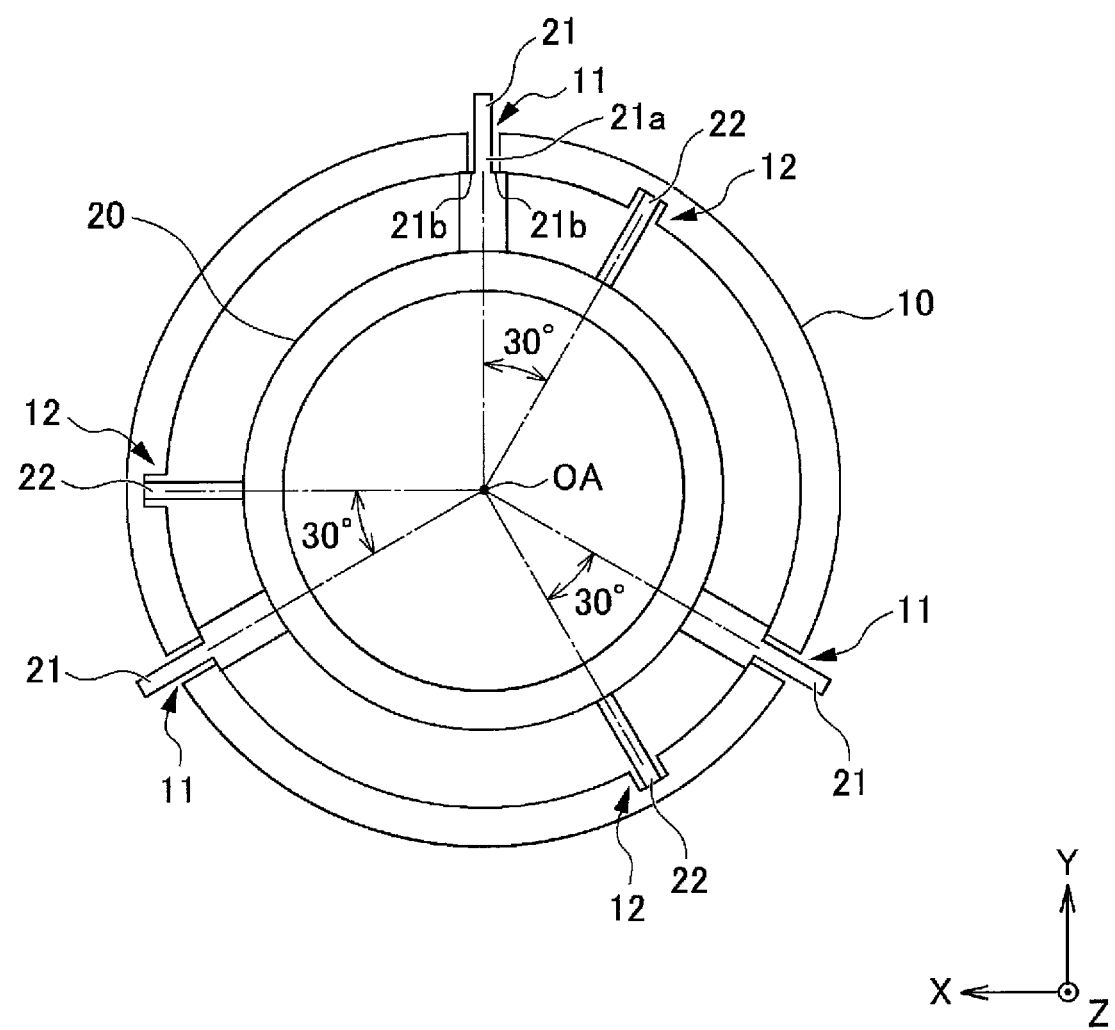
FIG. 6 is a schematic view illustrating an arrangement of protrusions arranged in a first linear motion barrel 20 and linear motion grooves provided in a fixed barrel 10.

FIG. 6 is a schematic view illustrating an arrangement of protrusions arranged in the first linear motion barrel 20 and linear motion grooves provided in the fixed barrel 10.

As illustrated in FIG. 2, the lens barrel component assembly LT includes the fixed barrel 10, the first linear motion barrel 20, a first rotating barrel 30, a second rotating barrel 40, and a second linear motion barrel 50. Axes of the barrels substantially coincide with the optical axis OA within the margin of errors such as manufacturing errors and the like, The optical axis OA is herein an optical axis of the photographing optical system included in the lens barrel 3.

The fixed barrel (first barrel) 10 is a cylindrical member that forms a base of the lens barrel component assembly LT. When the lens barrel 3 is attached to the camera body 2 for use, the fixed barrel 10 is fixed in position and angle relative to a mount part. The bayonet part (not shown) is joined to an end of the fixed barrel 10 on the minus Z direction side.

As illustrated in FIGS. 2 to 4, the fixed barrel 10 includes first linear motion grooves 11, second linear motion grooves 12, and cam grooves 13.

The first linear motion groove (first engaged part) 11 is a groove that linearly guides a first protrusion 21 (described later) of the first linear motion barrel 20. The first linear motion groove 11 is a penetrating groove that penetrates through the fixed barrel 10, having a linear shape in a direction along the optical axis OA. As illustrated in FIG. 3, three first linear motion grooves 11 are evenly spaced in the circumferential direction of the fixed barrel 10.

The second linear motion groove (second engaged part) 12 is a groove that linearly guides a second protrusion 22 of the first linear motion barrel 20. The second linear motion groove 12 is a non-penetrating groove that does not penetrate through the fixed barrel 10, having a linear shape in a direction along the optical axis OA. As illustrated in FIG. 6, three second linear motion grooves 12 are evenly spaced in the circumferential direction of the fixed barrel 10. Each second linear motion groove 12 is continuously provided from an end of the fixed barrel 10 on the rear end side (on the minus Z direction side in this embodiment). Each second linear motion groove 12 is further separated from the corresponding first linear motion groove 11 by 30 degrees around the optical axis OA, as illustrated in FIG. 6.

As illustrated in FIG. 4, the cam groove 13 is a groove that guides a cam follower 31 of the first rotating barrel 30 in the circumferential direction and in the linear motion direction. As illustrated in FIG. 3, three cam grooves 13 are evenly spaced in the circumferential direction of the fixed barrel 10. The cam grooves 13 have the same generally curved shape in a direction along the optical axis OA in the fixed barrel 10.

As illustrated in FIG. 2, the first linear motion barrel (second barrel) 20 is a cylindrical member that is arranged on the inner circumferential side of the fixed barrel 10 and can linearly move relative to the fixed barrel 10 in a direction along the optical axis OA.

As illustrated in FIG. 3, the first linear motion barrel 20 includes the first protrusions 21, the second protrusions 22, and cam followers 23.

The first protrusion (first engaging part) 21 is formed so as to protrude outward from the outer circumferential surface of the first linear motion barrel 20. The first protrusion 21 is a plate-like member that extends along the optical axis OA and engages with the first linear motion groove 11 of the fixed barrel 10. The first protrusion 21 moves along the first linear motion groove 11 while penetrating through the first linear motion groove 11. As illustrated in FIG. 6, three first protrusions 21 are evenly spaced in the circumferential direction of the first linear motion barrel 20. The first protrusion 21 is formed so as to have a convex cross section as viewed from the Z direction. The center part 21a of the first protrusion 21 penetrates through the first linear motion groove 11. Two shoulder parts 21b formed on both sides of the center part 21a abut against the inner circumferential surface of the fixed barrel 10 without penetrating through the first linear motion groove 11 (in FIG. 6, the reference numeral 21a for the center part and the reference numerals 21b for the shoulder parts are shown only for the first protrusion 21 located on the upper side in the Y direction).

The second protrusion (second engaging part) 22 is formed so as to protrude outward from the outer circumferential surface of the first linear motion barrel 20. As many second protrusions 22 as the first protrusions 21 are formed at positions different from the first protrusions 21 in the circumferential direction (see FIG. 6). The second protrusion 22 is a plate-like member that extends along the optical axis OA and engages with the second linear motion groove 12 of the fixed barrel 10. The second protrusion 22 moves along the second linear motion groove 12 while abutting against the inner circumferential surface of the second linear motion groove 12.

As illustrated in FIG. 6, on the inner circumferential side of the fixed barrel 10, the first linear motion groove 11 and the shoulder parts 21b of the first protrusion 21 abut against each other, and the second linear motion groove 12 and the second protrusion 22 abut against each other. The first linear motion barrel 20 can thus be stably held on the inner circumferential side of the fixed barrel 10 so that the axis of the first linear motion barrel 20 coincides with the optical axis OA when the center part 21a of the first protrusion 21 moves along the first linear motion groove 11.

As illustrated in FIG. 6, each second protrusion 22 is separated from the corresponding first protrusion 21 by 30 degrees around the optical axis OA. In other words, the first protrusions 21 and the second protrusions 22 are arranged at different positions in the circumferential direction of the first linear motion barrel 20 as viewed from a direction along the optical axis OA. Also as illustrated in FIGS. 2 and 4, a front end (an end in the plus Z direction) of the second protrusion 22 is arranged on a rear end side of the first linear motion barrel 20 (an end on the minus Z direction side in this embodiment), relative to a front end of the first protrusion 21 (an end in the plus Z direction). Furthermore, a rear end (an end in the minus Z direction) of the second protrusion 22 is arranged on the rear end side of the first linear motion barrel 20 (the end on the minus Z direction side in this embodiment), relative to a rear end of the first protrusion 21 (an end in the minus Z direction). In other words, the front end of the second protrusion 22 is arranged at a position different from the front end of the first protrusion 21 in a direction along the optical axis OA. Similarly, the rear end of the second protrusion 22 is arranged at a position different from the rear end of the first protrusion 21 in a direction along the optical axis OA. It should be noted that the front end of the second protrusion 22 and the rear end of the first protrusion 21 may be located at the same position or at different positions in a direction along the optical axis OA.

Actions of the first protrusions 21 and the second protrusions 22 in this embodiment will now be described.

An engagement length of the fixed barrel 10 and the first linear motion barrel 20 in a direction along the optical axis OA is typically restricted by the length of the fixed barrel 10 or the length of the first linear motion barrel 20 in the direction along the optical axis OA. Without the second protrusion 22, the substantial engagement length would therefore be the length a of the first protrusion 21 as illustrated in FIG. 2. In this case, it is difficult to maintain stable optical performance since the engagement length in the direction along the optical axis OA is too small to reduce a backlash between the fixed barrel 10 and the first linear motion barrel 20.

The first linear motion barrel 20 in the lens barrel 3 according to this embodiment includes, in addition to the first protrusion 21, the second protrusion 22 which is arranged at a position different from the first protrusion 21 in a direction along the optical axis OA. An apparent engagement length of the fixed barrel 10 and the first linear motion barrel 20 in the direction along the optical axis OA is therefore a length b (>a) in the lens barrel 3 according to this embodiment, as illustrated in FIG. 2. In this way, the lens barrel 3 according to this embodiment can achieve a larger substantial engagement length in the direction along the optical axis OA, so that a backlash between the fixed barrel 10 and the first linear motion barrel 20 can be reduced and stable optical performance can thus be maintained.

Additionally, the first linear motion barrel 20 can be formed by cutting out a region on the minus Z direction side of the first protrusion 21. This can allow different members to be arranged on the minus Z direction side of the first linear motion barrel 20 to achieve a reduction in size of the lens barrel 3. In this embodiment, the first linear motion barrel 20 has an upright wall part 24 which projects in a direction orthogonal to the optical axis OA on the rear end side of the first protrusion 21. The upright wall part 24 has a function as a light shielding member. The first linear motion barrel 20 has thither a cutout region on the minus Z direction side of the upright wall part 24. In the retracted state, a part of the fixed barrel 10 fits into the cutout region of the first linear motion barrel 20. In this way, the reduced length of the first protrusion 21 allows a part of the first linear motion barrel 20 to be cut out and other members to be arranged in the cutout region. This can achieve a reduced length of the lens barrel 3 in the retracted state.

It should be noted that at least a region of the first linear motion barrel 20 having one end of the first protrusion 21 formed therein may be formed to project from one end of the cylindrical member along the first linear motion groove 11. Alternatively at least a region of the first linear motion barrel 20 having the other end of the second protrusion 22 formed therein may be formed to project from the other end of the cylindrical member along the second linear motion groove 12.

Also as illustrated in FIG. 6, the first protrusions 21 and the second protrusions 22 are arranged at different positions in the circumferential direction on the outer circumference of the first linear motion barrel 20. In other words, the first linear motion barrel 20 is linearly guided by a plurality of types of protruding members. The first linear motion barrel 20 can therefore be linearly guided more smoothly than the case where it would be linearly guided by only one type of protrusions having an engagement length b.

A configuration of the lens barrel component assembly LT will be described, again with reference to the drawings.

In FIG. 2, the earn follower 23 of the first linear motion barrel 20 is a member that engages with a first cam groove 41 (described later) of the second rotating barrel 40. The cam follower 23 is formed integrally with the first protrusion 21 so as to protrude outward from the top of the first protrusion 21. Thus, as with the first protrusions 21, three cam followers 23 are evenly spaced in the circumferential direction on the outer circumference of the first linear motion barrel 20.

As illustrated in FIG. 2, the first rotating barrel (third barrel) 30 is a cylindrical member that is arranged between the fixed barrel 10 and the first linear motion barrel 20. An end of the first rotating barrel 30 on the minus Z side is always arranged on the plus Z direction side relative to an end of the first linear motion barrel 20 on the minus Z side. The first rotating barrel 30 includes the cam followers 31, protrusions 32, and cam grooves 33 (see FIG. 2), as illustrated in FIG. 3.

The cam follower 31 is a member that engages with the cam groove 13 of the fixed barrel 10. Three cam followers 31 are evenly spaced in the circumferential direction on the outer circumference of the first rotating barrel 30.

The protrusion 32 is a member that engages with a second cam groove 42 (described later) of the second rotating barrel 40. The protrusion 32 is formed integrally with the cam follower 31 so as to protrude outward from the top of the cam follower 31. Thus, as with the cam follower 31, three protrusions 32 are evenly spaced in the circumferential direction on the outer circumference of the first rotating barrel 30.

As illustrated in FIG. 2, the cam groove 33 is a groove that guides a cam follower 51 (described later) of the second linear motion barrel 50 in the circumferential direction. When the first rotating barrel 30 linearly moves along with the rotation of the second rotating barrel 40, the second linear motion barrel 50 engaging with the cam grooves 33 of the first rotating barrel 30 via the cam follower 51 linearly moves along linear motion grooves (not shown). Three cam grooves 33 are evenly spaced in the circumferential direction of the first rotating barrel 30. The cam grooves 33 have the same shape in a direction along the optical axis OA.

The second rotating barrel (fourth barrel) 40 is a cylindrical member that is arranged on the outer circumferential side of the fixed barrel 10. The second rotating barrel 40 is rotatable relative to the fixed barrel 10, but is prevented from moving in the direction along the optical axis OA (in the Z direction). A zoom ring (not shown) is provided on the outer circumference of the second rotating barrel 40. When the photographer rotates the zoom ring, the second rotating barrel 40 rotates clockwise or counterclockwise together with the zoom ring. The second rotating barrel 40 includes a first cam groove 41 and a second cam groove 42 (see FIG. 4). The second rotating barrel 40 may be integrated with the zoom ring or may be coupled to the zoom ring via another member.

The first cam groove 41 is a groove that drives the cam follower 23 of the first linear motion barrel 20 in a direction along the optical axis OA. When the second rotating barrel 40 rotates, the cam follower 23 is driven in the direction along the optical axis OA by the first cam groove 41 of the second rotating barrel 40. The first linear motion barrel 20 thus moves in the direction along the optical axis OA while the rotation of the first protrusion 21 in the circumferential direction is restricted by the first linear motion groove 11.

Three first cam grooves 41 are evenly spaced in the circumferential direction of the second rotating barrel 40. The first cam grooves 41 have the same shape in a direction along the optical axis OA.

The second cam groove 42 is a groove that drives the protrusion 32 of the first rotating barrel 30 in the circumferential direction. When the second rotating barrel 40 rotates, the protrusion 32 is driven in the circumferential direction by the second cam groove 42 of the second rotating barrel 40. The cam follower 31 integrated with the protrusion 32 of the first rotating barrel 30 is therefore guided along the earn groove 13 of the fixed barrel 10. As a result, the first rotating barrel 30 moves in the direction along the optical axis OA while rotating in the circumferential direction. Three second cam grooves 42 are evenly spaced in the circumferential direction of the second rotating barrel 40. The second cam grooves 42 have the same shape in a direction along the optical axis OA.

The second linear motion barrel 50 is arranged on the outer circumferential side of the first linear motion barrel 20 and between the first linear motion barrel 20 and the first rotating barrel 30. The second linear motion barrel 50 is a cylindrical member that can linearly move relative to the first linear motion barrel 20 in the direction along the optical axis OA. As illustrated in FIGS. 2 and 3, the second linear motion barrel 50 includes a cam follower 51.

The cam follower 51 is a member that engages with the earn groove 33 of the first rotating barrel 30. Three cam followers 51 are evenly spaced in the circumferential direction on the outer circumference of the second linear motion barrel 50.

An operation of the lens barrel component assembly LT will now be described.

When the photographer rotates the zoom ring (not shown), the second rotating barrel 40 rotates clockwise or counterclockwise together with the zoom ring. When the second rotating barrel 40 rotates, the first linear motion barrel 20 engaging with the first cam groove 41 of the second rotating barrel 40 via the cam follower 23 moves in the direction along the optical axis OA while the rotation of the first protrusion 21 in the circumferential direction is restricted by the first linear motion groove 11, as illustrated in FIG. 2. At the same time, the second protrusion 22 of the first linear motion barrel 20 is linearly guided in the second linear motion groove 12 of the fixed barrel 10, which is engaged with the second protrusion 22, to move in the direction along the optical axis OA.

Furthermore, when the second rotating barrel 40 rotates, the cam follower 31 of the first rotating barrel 30 which engages with the second cam groove 42 of the second rotating barrel 40 via the protrusion 32 is guided along the cam groove 13 of the fixed barrel 10, as illustrated in FIG. 4. As a result, the first rotating barrel 30 Moves in the same direction as the first linear motion barrel 20 along the optical axis OA while rotating in the circumferential direction.

Additionally, when the first rotating barrel 30 rotates in the circumferential direction, the second linear motion barrel 50 engaging with the cam groove 33 of the first rotating barrel 30 via the cam follower 51 moves along the optical axis OA while rotating in the circumferential direction along the cam groove 33 of the first rotating barrel 30, as illustrated in FIG. 2.

In this way, when the second rotating barrel 40 rotates together with the zoom ring operated by the photographer, the first linear motion barrel 20, the first rotating barrel 30, and the second linear motion barrel 50 move (advance or retract) in the same direction along the optical axis OA.

Thus, rotating the second rotating barrel 40 in a predetermined direction allows the barrels to be extended out to their longest position, as illustrated in FIGS. 2 and 4. Furthermore, rotating the second rotating barrel 40 in a direction opposite to a predetermined direction allows the barrels to be retracted back to their shortest position, as illustrated in FIG. 4.

According to this embodiment, the following effects can be achieved.

(1) The lens barrel 3 can achieve a larger engagement length of the fixed barrel 10 and the first linear motion barrel 20 which move relative to each other, so that a backlash between the fixed barrel 10 and the first linear motion barrel 20 can be reduced and stable optical performance can thus be maintained.

(2) In the lens barrel 3, the second linear motion grooves 12 are non-penetrating grooves that do not penetrate through the fixed barrel 10. The first barrel barrel 20 can thus be held by the second linear motion grooves 12 so that it can be linearly guided in the direction along the optical axis OA. Furthermore, the second linear motion groove 12 can stably hold the first linear motion barrel 20 on the inner circumferential side of the fixed barrel 10 so that the axis of the first linear motion barrel 20 coincides with the optical axis OA.

(3) In the lens barrel 3, the front end of the second protrusion 22 of the first linear motion barrel 20 is located on the front end side relative to the front end of the first protrusion 21. The second linear motion groove 12 engaging with the second protrusion 22 is provided at the end of the fixed barrel 10 on the rear end side. In this way, the lens barrel 3 allows the rear end of the second protrusion 22 to be separated from the front end of the first protrusion 21 as much as possible. This results in a larger apparent engagement length of the fixed barrel 10 and the first linear motion barrel 20 in the direction along the optical axis OA.

(4) in the lens barrel 3, the engagement length in the direction along the optical axis OA is not affected even by arrangement of another movable barrel between the fixed barrel 10 and the first linear motion barrel 20 which do not directly overlap each other. Stable optical performance can therefore be maintained, even if the lens barrel 3 includes a plurality of barrels as in the case of a zoom lens.

(5) In the lens barrel 3, the first protrusions 21 and the second protrusions 22 are arranged at different positions in the circumferential direction of the first linear motion barrel 20 as viewed from a direction perpendicular to the optical axis OA. Moving ranges of both the first protrusion 21 and the second protrusion 22 in the lens barrel 3 can thus be designed to be larger.

(6) in the lens barrel 3, the first protrusion 21 of the first linear motion barrel 20 is formed integrally with the cam follower 23 which engages with the first cam groove 41. The first protrusion 21 and the cam follower 23 may thus not necessarily be separate parts in the lens barrel 3. This can achieve a reduction in cost and a simplification of the structure caused by a reduction in the number of parts.

Variations

The present invention is not limited to the embodiment described above. Various modifications and changes as described below can be made and also encompassed within the scope of the present invention.

(1) In the above embodiment, two movable barrels (the first linear motion barrel 20 and the first rotating barrel 30) are arranged between the fixed barrel 10 and the first linear motion barrel 20. The present invention is not limited to this configuration. One movable barrel or three or more movable barrels may be arranged between the fixed barrel 10 and the first linear motion barrel 20.

(2) In the example of the above embodiment, two barrels moving relative to each other are the fixed barrel 10 and the first linear motion barrel 20. The configuration of the present invention may be applied not only to these barrels, but also two linear motion barrels moving relative to each other.

(3) In the example of the above embodiment, three first protrusions 21 are evenly spaced and three second protrusions 22 are evenly spaced in the circumferential direction of the first linear motion barrel 20, as illustrated in FIG. 6. The present invention is not limited to this configuration. Two first protrusions 21 may be evenly spaced and two second protrusions 22 may be evenly spaced, or four or more first protrusions 21 may be evenly spaced and four or more second protrusions 22 may be evenly spaced in the circumferential direction of the first linear motion barrel 20. Additionally, an angle formed by a first protrusion 21 and a second protrusion 22 that are adjacent to each other is not limited to 30 degrees as illustrated in FIG. 6, An appropriate angle can be set for each case. For example, the first protrusion 21 and the second protrusion 22 may be separated by 60 degrees around the optical axis OA as viewed from the Z direction in FIG. 6. In this case, all of the first protrusions 21 and the second protrusions 22 are evenly spaced in the circumferential direction of the first linear motion barrel 20.

The first protrusions 21 and the second protrusions 22 may be unevenly spaced in the circumferential direction on the outer circumference of the first linear motion barrel 20. Additionally, the first protrusions 21 may be evenly or unevenly spaced in the circumferential direction on the outer circumference of the first linear motion barrel 20. Similarly, the second protrusions 22 may be evenly or unevenly spaced in the circumferential direction on the outer circumference of the first linear motion barrel 20. Further, the number of the first protrusions 21 may not necessarily be the same as the number of the second protrusions 22. Still further, the first protrusion 21 may be arranged on the minus Z side of the second protrusion 22.

(4) In the above embodiment, the first rotating barrel 30 has the cam followers 31 and the protrusions 32 on its outer circumferential surface. Additionally, in the example of the above embodiment, the cam follower 31 and the protrusion 32 forming an integrated metal cut workpiece are fixed on the outer circumferential surface of the first rotating barrel 30. The present invention is not limited to this. The first rotating barrel 30, the cam followers 31, and the protrusions 32 may be integrally molded. Alternatively, the cam followers 31 and the protrusions 32 may be separately prepared and sequentially fixed on the outer circumferential surface of the first rotating barrel 30. Furthermore, the first rotating barrel 30 and the cam followers 31 may be integrally molded and the protrusions 32 may be fixed to the cam followers.

(5) In the above embodiment, the lens barrel 3 is a retractable zoom lens. That is, the focal length of the lens barrel 3 is continuously variable and the total length of the lens barrel 3 can be reduced when not in use. The present invention is not limited to such a lens barrel. The lens barrel 3 may be a prime lens having a fixed focal length. Alternatively, the lens barrel 3 may be a zoom lens that is not retractable.

(6) In the above embodiment, the camera 1 including the lens barrel 3 is a digital single lens reflex camera having interchangeable lenses. The present invention is not limited to such a camera. The configuration of the present invention may also be applied to a mirrorless single lens camera having interchangeable lenses, a digital camera having an integrated lens, a video camera, a mobile terminal, and the like.

Although the embodiment and variations may be combined as appropriate, the detail description thereof will be omitted. Furthermore, the present invention is not limited to the above embodiment.

REFERENCE SIGNS LIST

1: camera, 2: camera body, 3: lens barrel, 10: fixed barrel, 11: first linear motion groove, 12: second linear motion groove, 20: first linear motion barrel, 21: first protrusion, 22: second protrusion, 23: cam follower, 30: first rotating barrel, 40: second rotating barrel, 50: second linear motion barrel

The invention claimed is:

1. A lens barrel comprising:
a first barrel; and
a second barrel that is arranged on an outer circumferential side or on an inner circumferential side of the first barrel, the second barrel being movable in an optical axis direction relative to the first barrel without being rotated relative to the first barrel, wherein:
the second barrel has:
 a first engaging part that engages with the first barrel;
 a second engaging part that engages with the first barrel, and that is arranged at a position different from a position of the first engaging part along the optical axis direction;
 a third engaging part that engages with the first barrel, and that is arranged at a position different from a position of the first engaging part in a circumferential direction around the optical axis; and
 a fourth engaging part that engages with the first barrel, and that is arranged at a position different from a position of the third engaging part along the optical axis direction;
the first barrel has:
 a first engaged part with which the first engaging part is engaged so as to be linearly movable;
 a second engaged part with which the second engaging part is engaged so as to be linearly movable;
 a third engaged part with which the third engaging part is engaged so as to be linearly movable; and
 a fourth engaged part with which the fourth engaging part is engaged so as to be linearly movable;
the second engaging part is arranged closer to the first engaging part than to the third engaging part and the fourth engaging part; and
a region where the first engaging part engages with the first engaged part and a region where the second engaging part engages with the second engaged part are arranged at different positions in the optical axis direction.

2. The lens barrel according to claim 1, wherein:
the first engaging part is formed so as to protrude in a direction from an outer circumferential surface or an inner circumferential surface of the second barrel toward the first barrel.

3. The lens barrel according to claim 1, wherein:
one end of the region where the first engaging part engages with the first engaged part is located at a position different from one end of the region where the second engaging part engages with the second engaged part, in the optical axis direction; and
another end of the region where the first engaging part engages with the first engaged part is located at a position different from another end of the region where the second engaging part engages with the second engaged part, in the optical axis direction.

4. The lens barrel according to claim 1, further comprising:
a third barrel that is arranged on the outer circumferential side or on the inner circumferential side of the first barrel, the third barrel being movable in the optical axis direction relative to the first barrel; and
as the third barrel moves in the optical axis direction so that the first barrel and the third barrel are closer to each other, at least a part of the third barrel is arranged at a same position as a position of at least a part of the region where the first engaging part engages with the first engaged part, in the optical axis direction.

5. The lens barrel according to claim 1, wherein:
one end of the region where the first engaging part engages with the first engaged part is located on a front side relative to one end of the region where the second engaging part engages with the second engaged part, in the optical axis direction; and
another end of the region where the first engaging part engages with the first engaged part is located on the front side relative to another end of the region where the second engaging part engages with the second engaged part, in the optical axis direction.

6. The lens barrel according to claim 5, wherein:
the second barrel is arranged on the inner circumferential side of the first barrel;
an inner circumferential surface of the first barrel has a large diameter part and a small diameter part, the small diameter part protruding to the inner circumferential side relative to the large diameter part; and
as the second barrel moves in the optical axis direction so that the first barrel and the second barrel are closer to each other, at least a part of the small diameter part is arranged at a same position as a position of at least a part of the region where the second engaging part engages with the second engaged part, in the optical axis direction.

7. A lens barrel comprising:
a first barrel; and
a second barrel that is linearly movable in an optical axis direction relative to the first barrel, wherein:
the second barrel has:
a first engaging part;
a second engaging part, at least a part of the second engaging part being arranged at a position different from a position of the first engaging part along the optical axis direction; and
a cutout part, at leas part of the cutout part being arranged at a same position as a position of the second engaging part along the optical axis direction;
the first barrel has a first engaged part that linearly guides the first engaging part and a second engaged part that linearly guides the second engaging part; and
at least a part of the first barrel fits into the cutout part in a state where an end of the first barrel toward an image plane and an end of the second barrel toward the image plane are closest to each other.

8. The lens barrel according to claim 7, wherein:
the first engaging part and the second engaging part are arranged at different positions in a circumferential direction of the second barrel.

9. The lens barrel according to claim 7, wherein:
the second barrel is arranged on an inner circumferential side of the first barrel;
the first engaged part is a penetrating groove through which at least a part of the first engaging part penetrates beyond the first barrel to an outer circumferential side; and
the second engaged part is a non-penetrating groove through which the second engaging part does not penetrate beyond the first barrel to the outer circumferential side.

10. The lens barrel according to claim 7, wherein:
the second engaging part is located on one end side of the second barrel relative to the first engaging part; and
the second engaged part is provided at an end of the first barrel on the one end side.

11. The lens barrel according to claim 7, wherein:
a third barrel is arranged between the second barrel and the first barrel.

12. The lens barrel according to claim 7, further comprising:
a fourth barrel that is arranged on an outer circumferential side of the first barrel and the second barrel, wherein:
the fourth barrel has a cam groove for driving the second barrel; and
the first engaging part of the second barrel and a cam follower engaging with the cam groove are integrated with each other.

13. The lens barrel according to claim 7, wherein:
the first barrel is arranged on an outer circumferential side of the second barrel; and
the first barrel has a large diameter part having a diameter larger than an outer diameter of the second barrel and a small diameter part having a diameter smaller than the outer diameter of the second barrel.

14. The lens barrel according to claim 7, wherein:
the first barrel is arranged on an outer circumferential side of the second barrel,
the first barrel has a large diameter part having a diameter larger than an outer diameter of the second barrel and a small diameter part having a diameter smaller than the outer diameter of the second barrel; and
in a retracted state, at least a part of the small diameter part is arranged in a region where the cutout part is formed.

15. The lens barrel according to claim 7, wherein:
a third barrel is arranged between the second barrel and the first barrel; and
in a retracted state, at least a part of the third barrel and at least a part of the first engaging part are arranged at a same position in the optical axis direction.

16. A camera comprising the lens barrel according to claim 7.

* * * * *